United States Patent [19]

Ribka et al.

[11] 3,954,396
[45] May 4, 1976

[54] DYEING SYNTHETIC MATERIALS WITH A DODECYL BENZOICACID ESTER-AZO-(3-CYANO-4-METHYL-6-HYDROXY-2-PYRIDONE)

[75] Inventors: Joachim Ribka, Offenbach, Main; Ernst Heinrich, Frankfurt am Main-Fechenheim, both of Germany

[73] Assignee: Cassella Farbwerke Mainkur Aktiengesellschaft, Germany

[22] Filed: May 6, 1974

[21] Appl. No.: 467,077

Related U.S. Application Data

[60] Division of Ser. No. 413,495, Nov. 7, 1973, abandoned, which is a continuation of Ser. No. 290,550, Sept. 20, 1972, abandoned.

[30] Foreign Application Priority Data

Sept. 24, 1971 Germany.............................. 2147759

[52] U.S. Cl. ..................................... 8/41 A; 8/41 B; 8/41 C; 8/41 D; 260/156
[51] Int. Cl.² ......................................... C09B 27/00
[58] Field of Search ............. 260/156; 8/41 R, 41 A, 8/41 B, 41 C, 41 D

[56] References Cited
UNITED STATES PATENTS

| | | |
|---|---|---|
| 3,487,066 | 12/1969 | Ritter et al........................... 260/156 |
| 3,640,674 | 2/1972 | Berrie et al............................... 8/41 |
| 3,657,214 | 4/1972 | Berrie et al.......................... 260/156 |

FOREIGN PATENTS OR APPLICATIONS

| | | | |
|---|---|---|---|
| 1,901,711 | 4/1970 | Germany ............................ 260/156 |
| 1,901,712 | 9/1970 | Germany ............................ 260/156 |
| 2,002,022 | 7/1971 | Germany ............................ 260/156 |
| 2,004,487 | 8/1971 | Germany ............................ 260/156 |

*Primary Examiner*—Donald Levy
*Attorney, Agent, or Firm*—Connolly and Hutz

[57] ABSTRACT

Monoazo dyestuffs, free of ionizable groups of the formula:

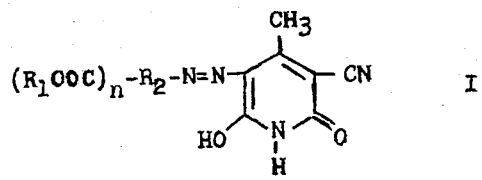

wherein $R_1$ is substituted ethyl or substituted or unsubstituted alkyl or alkenyl having 3 to 12 carbon atoms, cycloalkyl or aralkyl, $R_2$ is phenylene or substituted phenylene and $n$ is an integer from 1 to 3.

2 Claims, No Drawings

DYEING SYNTHETIC MATERIALS WITH A DODECYL BENZOIC ACID ESTER-AZO-(3-CYANO-4-METHYL-6-HYDROXY-2-PYRIDONE)

CROSS-REFERENCE TO RELATED APPLICATIONS

This application is a division of application Ser. No. 413,495 filed Nov. 7, 1973, and now abandoned which, in turn, is a continuation of application Ser. No. 290,550 filed Sept. 20, 1972, and now abandoned.

The present invention relates to valuable, novel, water-insoluble monazo dyestuffs, free of ionizable groups, of the formula:

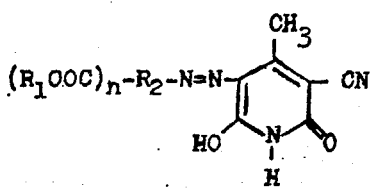   I wherein $R_1$ is ethyl substituted by at least one substituent selected from the group consisting of halogen, hydroxy, alkoxy having 1 to 4 carbon atoms, phenoxy, alkanoyloxy having 2 to 5 carbon atoms, benzoyloxy and cyano; alkyl and alkenyl having 3 to 12 carbon atoms; said alkyl and said alkenyl substituted by at least one of the aforesaid substituents for substituted ethyl; cycloalkyl having 3 to 7 carbon atoms; said cycloalkyl substituted by at least one of the aforesaid substituents for substituted ethyl or by alkyl having 1 to 4 carbon atoms; benzyl; phenethyl; or benzyl or phenethyl substituted by at least one of the aforesaid substituents for substituted ethyl or by alkyl having 1 to 4 carbon atoms; $R_2$ is phenylene or phenylene substituted by at least one substituent selected from the group consisting of halogen, alkyl having 1 to 4 carbon atoms, alkoxy having 1 to 4 carbon atoms and nitro and n is an integer of from 1 to 3.

The cycloalkyl radicals defining $R_1$ which are of principal interest include cyclopentyl and cyclohexyl. The aforesaid halogen substituents for both $R_1$ and $R_2$ are preferably chlorine or bromine. It will further be apparent to those skilled in the art that the alkoxy, aryloxy, acyloxy, aroyloxy and alkyl substituents specified above in connection with $R_1$ and $R_2$ may themselves be further substituted and that these should be treated as equivalents. Included as exemplary of such substituents are radicals derived from ethylene glycol or diethylene glycol which may or may not be etherified.

In the following formulae and explanations, $R_1$, $R_2$ and n have the above-stated meanings.

The novel dyestuffs are obtained from an amine of the formula:

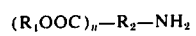   II which is free of ionizable groups by diazotizing and coupling with 3-cyano-4-methyl-6-hydroxy-2-pyridone of the formula:

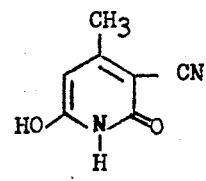   III

It may be advantageous, in the formulation of the dispersion dyestuffs, to diazotize a mixture of two or more amines of formula II and to couple with 3-cyano-4-methyl-6-hydroxy-2-pyridone of formula III.

The novel dyestuffs of formula I and the starting compound of formula III may be present in tautomeric forms. For example, the following tautomeric forms are feasible for the dyestuffs of formula I and the starting compound of formula III:

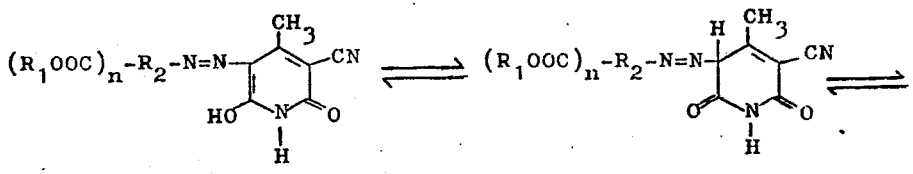

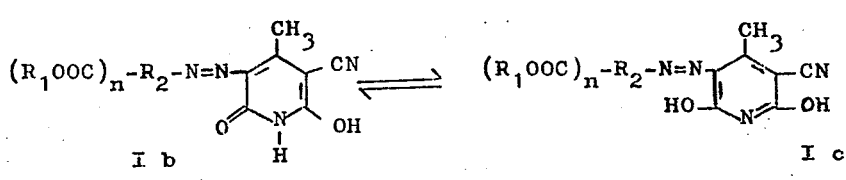

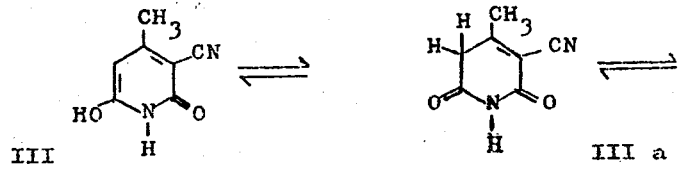

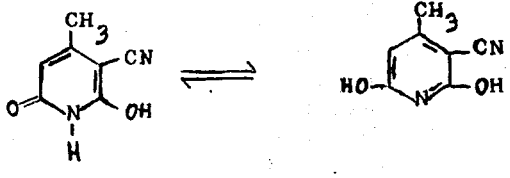

It is expressly understood that formula I and III in both the specification and claims of the present invention embrace within their scope of the tautomers thereof such as represented by the foregoing formulae.

The preparation of the amines of formula II, required as starting products, takes place, for example, by first reacting a nitroaryl carbonic acid chloride of formula IV with hydroxyalkyl, hydroxyalkenyl, hydroxycycloalkyl or hydroxyaryl compound of formula V and the nitro ester of formula VI obtained thereby is reduced to the corresponding amine II by hydration in the known manner:

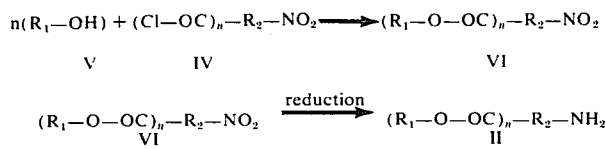

The nitroaryl carbonic acid chlorides of formula IV may be prepared from the appropriate nitroaryl carbonic acids in accordance with those methods which are known for the conversion of a carbonic acid into the corresponding acid chloride.

A further process for the preparation of the amines required as starting materials consists of first reducing nitroaryl carbonic acids of formula VII to the corresponding aminoaryl carbonic acids of formula VIII and esterifying the latter with the hydroxyalkyl, hydroxyalkylene, hydroxycycloalkyl or hydroxyaralkyl compounds of formula V:

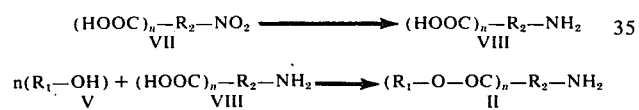

The following may be used as nitroaryl carbonic acids of formula VII:
2-, 3- or 4-nitrobenzoic acid
2-nitro-3- or 4-methylbenzoic acid
2-nitro-5-methoxybenzoic acid
2-nitro-3-, 4- or 5-chlorobenzoic acid
2-nitro-3-chloro-6-methoxybenzoic acid
2-nitro-3,5-dichlorobenzoic acid
2-nitro-3-, 4- or 5-chlorobenzoic acid
2-nitro-4-bromo-6-methylbenzoic acid
2-nitro-3,5-dibromobenzoic acid
3-nitro-4- or 6-methylbenzoic acid
3-nitro-4- or 6-methoxybenzoic acid
3-nitro-4- or 6-ethoxybenzoic acid
3-nitro-2-, 4-, 5- or 6-chlorobenzoic acid
3-nitro-2-chloro-4-methylbenzoic acid
3-nitro-4-chloro-2- or 6-methylbenzoic acid
3-nitro-2-, 4-, 5- or 6-bromobenzoic acid
3-nitro-4-bromo-2- or 6-methylbenzoic acid
4-nitro-2- or 3-methylbenzoic acid
4-nitro-3-methoxy or ethoxybenzoic acid
4-nitro-2- or 3-chlorobenzoic acid
4-nitro-2- or 3-bromobenzoic acid
4-nitro-3,5-dichloro or dibromobenzoic acid
1- or 2-nitrobenzene-5,6-dicarbonic acid
1-nitrobenzene-3,5-dicarbonic acid
1-nitrobenzene-2,5-dicarbonic acid
1-nitrobenzene-2,4,6-tricarbonic acid.

As aminoarylcarbonic acids of formula VIII, the following may be used directly for the esterification:

4-nitro-2-aminobenzoic acid
5-nitro-2-aminobenzoic acid
5-nitro-4-aminobenzoic acid.

As hydroxyalkyl, hydroxyalkenyl, hydroxycycloalkyl or hydroxyaralkyl compounds of formula V may be used, for example:
2-chloro-, 2-bromo- or 2-cyanoethanol-(1)
ethylene glycol
diethylene glycol
triethylene glycol
ethylene glycol monomethyl ether, monoethylether, monoisopropylether, mono-n-butylether, monophenylether or monoxylenylether
diethylene glycol monomethylether, monoethylether or mono-n-butylether
triethylene glycol monomethylether, monoethylether or mono-n-butylether.
n- or isopropanol
1,3-dichloropropanol-(2)
propylene glycol-(1,2) or (1,3)
3-chloropropane diol-(1,2)
propene-(1)-ol-(3)
2-methylpropene-(1)-ol-(3)
n-, sec.-, iso- or tert.-butanol
butylene glycol-(1,3), (2,3) or (1,4)
3- or 4-methoxybutanol-(1)
butene-(1)-ol-(2)
n- or isopentanol
n-hexanol
3ethylhexanol
hexane diol-(1,6)
n- or isoheptanol
sec.- or isooctanol
isononylalcohol
decanol-(1)
dodecanol-(1)
cyclohexanol
4-methyl or 4-methoxycyclohexanol
phenylmethyl alcohol
(4-chlorophenyl)-methyl alcohol
phenylethyl alcohol
(4-cyanophenyl)-ethyl alcohol The preparation of the coupling components III may occur in accordance with the procedure given by Bobbitt and Scola, J. Org. Chem. 25, 560, by the condensation of acetoacetic acid ethyl ester with cyanoacetamide in the presence of potassium hydroxide in boiling methanol.

The novel dyestuffs are particularly suitable for the dyeing and printing of synthetic materials, such as polyolefins, polyvinyl compounds, polyacrylonitrile, cellulose-2 ½-acetate, cellulose triacetate and especially polyester materials, e.g., polyethylene glycol terephthalate. They yield, according to the customary dyeing and printing processes, colorfast and deep yellow dyeings and printings with very good fastness properties, particularly very good light and sublimation properties.

The dyeing of the stated fiber goods with the novel dyestuffs occurs suitably from an aqueous suspension in the presence of carriers between about 80°–110°C., in the absence of carriers between about 110°–140°C., as well as according to the so-called thermofixing process at about 180°–230°C. The printing of the stated materials may be carried out in such a manner that the goods printed with the novel dyestuffs are steamed in the presence of a carrier at temperatures between about 80°–110°C. or even in the absence of a carrier at about 110°–140°C. or are also treated according to the so-called thermofixing process at about 180°–230°C.

The novel dyestuffs are also suitable for the dyeing of the above-mentioned hydrophobic materials from organic solvents and for the dyeing in the bulk.

A preferred group of novel dyestuffs is such wherein in the general formula I, $R_1$ is an alkyl radical with 4 to 12 carbon atoms and $n$ is the number 1.

The novel dyestuffs act considerably more advantageously in the color synthesis and in the fixing fastness than the dyestuff disclosed in the German Published Application 1 544 446, Example 1, which is obtained by the coupling of diazotized 4-amino-benzoic acid ethyl ester with 3-cyano-4-methyl-6-hydroxy-2-pyridone.

EXAMPLE 1 a. Initially, 27.7 parts by weight 4-aminobenzoic acid n-decylester are diazotized in 300 parts by weight water with the addition of 36.0 parts by weight 30% hydrochloric acid at 0°C. to 5°C. and a solution of 7.7 parts by weight sodium nitrite in 50 parts by weight water. The filtered, clear diazo solution is then allowed to be introduced into a suspension of 16.5 parts by weight 3-cyano-4-methyl-6-hydroxy-2-pyridone in 400 parts by weight water, 16.6 parts by weight caustic soda (33° Be) and 27.0 parts by weight sodium acetate and the reaction temperature during coupling is maintained at 0° to 5°C. by the addition of 500 parts by weight ice. The resulting dyestuff is drawn off upon the completion of coupling, washed neutral with water and dried. It is in the form of a yellow powder.

b. The thusly obtained finely dispersed dyestuff (1.0 part by weight) of the formula

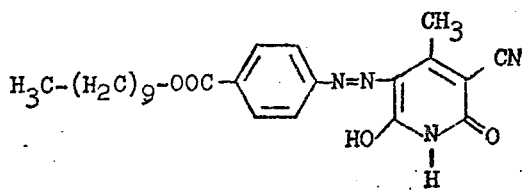

is stirred into 2,000 parts by weight water. This is standardized with acetic acid to a pH value of 5–6 and mixed with 4 parts by weight ammonium sulfate and 2 parts by weight of a commercial dispersing agent which is a naphthalene sulfonic acid formaldehyde condensate.

To the thusly obtained dye bath are added 100 parts by weight of a polyester fabric of polyethylene glycol terephthalate and dyeing proceeds for 1 ½ hours at 120°–130°C. Upon subsequent washing, reductive aftertreatment with a 0.2% alkaline sodium dithionite solution for 15 minutes at 60°–70°C., washing and drying, there is obtained a deep yellow dyeing with very good fastness properties, particularly very good fastness to light.

EXAMPLE 2 a. Initially, 19.3 parts by weight of 2-aminobenzoic acid-n-butylester are diazotized as described in Example 1, coupled with 16.5 parts by weight 3-cyano-4-methyl-6-hydroxy-2-pyridone and isolated. The resulting dyestuff is in the form of a yellow powder.

b. The dyestuff obtained in accordance with Example 2a (20 parts by weight) of the formula

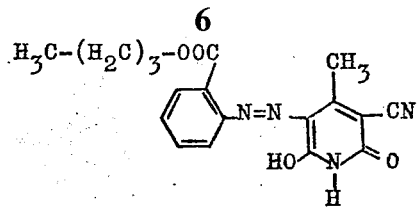

in the form of a fine dispersion is incorporated in a printing paste, which contains 45.0 parts by weight carob bean flour, 6.0 parts by weight 3-nitrobenzenesulfonoacid sodium and 3.0 parts by weight citric acid to 1000 parts by weight. With this printing paste, upon the printing, drying and fixing in the thermofixing frame for 45 seconds at 215°C., washing and finishing as described in paragraph 2 of Example 1b, there is obtained on a polyester fabric a greenish-yellow print of very good fastness properties. The dyestuff yields a yellow print of high fastness to light in the printing of triacetate when the dyestuff is used in the form of the above-stated printing paste, and the printed fabric, upon drying, is steamed for 10 minutes at 1.5 atmospheres excess pressure, washed, soaped, again washed and dried.

EXAMPLE 3 a. Initially, 23.8 parts by weight 5-nitro-4-aminobenzoic acid n-butyl ester are diazotizied in 150 parts by weight glacial acetic acid with 34.2 parts by weight nitrosyl sulfuric acid (41.3%) at 15°C. The clear diazo solution is then introduced into a suspension of 16.5 parts by weight 3-cyano-4-methyl-6-hydroxy-2-pyridone in 400 parts by weight water and 122 parts by weight caustic soda (33° Be). The reaction temperature during coupling is maintained at 0° to 5°C. by the addition of 500 parts by weight ice. The resulting dyestuff is drawn off upon coupling completion, washed neutral with water and dried. It is in the form of a yellow powder.

b. A fabric of polyethylene glycol terephthalate is padded with a liquor at 30°C. on a pad, which contains 30 parts by weight of the finely dispersed dyestuff of the formula

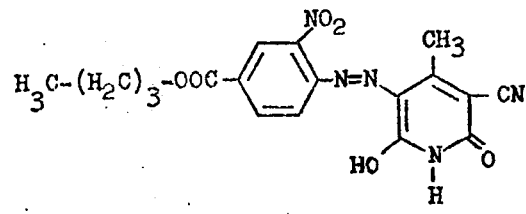

1.0 part by weight polyacrylamide having a K value of 120 and 0.5 parts by weight of a polyglycol ether of oleyl alcohol and 968.5 parts by weight water. Upon drying, fixing took place for 60 seconds in the thermofixing frame at 210°C. After the subsequent washing and finishing as described in Example 1b, paragraph 2, there is obtained a greenish-yellow dye having exceptional fastness properties.

In the following table, there are presented further novel dyestuffs which yield yellow dyeings or prints on polyester materials with equally good fastness properties.

Dyestuffs of the formula

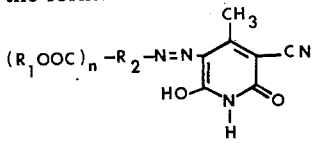
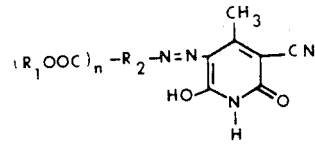

| No. | $(R_1OOC)_n-R_2-$ |
|---|---|
| 1 | $(n)H_7C_3-OOC-C_6H_4-$ |
| 2 | $(iso)H_7C_3-OOC-C_6H_4-$ |
| 3 | $Cl-H_2C-CH(-OOC-C_6H_4-)-CH_2-Cl$ |
| 4 | $(iso)H_9C_4-OOC-C_6H_4-$ |
| 5 | $(sec)H_9C_4-OOC-C_6H_4-$ |
| 6 | $(tert.)H_9C_4-OOC-C_6H_4-$ |
| 7 | $(iso)H_{11}C_5-OOC-C_6H_4-$ |
| 8 | $(n)H_{13}C_6-OOC-C_6H_4-$ |
| 9 | $(n)H_{15}C_7-OOC-C_6H_4-$ |
| 10 | $(iso)H_{15}C_7-OOC-C_6H_4-$ |
| 11 | $(sec)H_{17}C_8-OOC-C_6H_4-$ |
| 12 | $(iso)H_{17}C_8-OOC-C_6H_4-$ |
| 13 | $(iso)H_{19}C_9-OOC-C_6H_4-$ |
| 14 | $(n)H_{21}C_{10}-OOC-C_6H_4-$ |
| 15 | $(n)H_{25}C_{12}-OOC-C_6H_4-$ |
| 16 | $Cl-H_2C-H_2C-OOC-C_6H_4-$ |
| 17 | $Br-H_2C-H_2C-OOC-C_6H_4-$ |
| 18 | $NC-H_2C-H_2C-OOC-C_6H_4-$ |
| 19 | $HO-H_2C-H_2C-OOC-C_6H_4-$ |
| 20 | $H_3CO-H_2C-H_2C-OOC-C_6H_4-$ |
| 21 | $H_5C_2O-H_2C-H_2C-OOC-C_6H_4-$ |
| 22 | $(n)H_9C_4O-H_2C-H_2C-OOC-C_6H_4-$ |
| 23 | $H_3C-C_6H_3(CH_3)-O-H_2C-H_2C-OOC-C_6H_4-$ |
| 24 | $H(-O-H_2C-H_2C-)_2-OOC-C_6H_4-$ |
| 25 | $H_3C(-O-H_2C-H_2C-)_2-OOC-C_6H_4-$ |
| 26 | $H_5C_2(-O-H_2C-H_2C-)_2-OOC-C_6H_4-$ |
| 27 | $(n)H_9C_4(-O-H_2C-H_2C-)_2-OOC-C_6H_4-$ |
| 28 | $H(-O-H_2C-H_2C-)_3-OOC-C_6H_4-$ |
| 29 | $H_3C(-O-H_2C-H_2C-)_3-OOC-C_6H_4-$ |
| 30 | $H_5C_2(-O-H_2C-H_2C-)_3-OOC-C_6H_4-$ |
| 31 | $(n)H_9C_4(-O-H_2C-H_2C-)_3-OOC-C_6H_4-$ |
| 32 | $H_3C-CO-O-H_2C-H_2C-OOC-C_6H_4-$ |

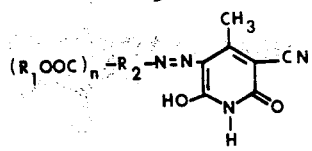
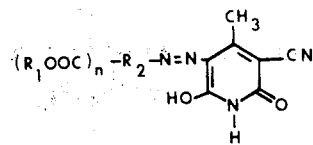

| No. | $(R_1OOC)_n-R_2-$ | No. | $(R_1OOC)_n-R_2-$ |
|---|---|---|---|
| 33 | $H_2C=HC-H_2C-OOC-C_6H_4-$ | 49 | $(n)H_{15}C_7-OOC-C_6H_4-$ |
| 34 | $H_2C=C(CH_3)-H_2C-OOC-C_6H_4-$ | 50 | $(iso)H_{15}C_7-OOC-C_6H_4-$ |
| 35 | $H_3C-HC(OH)-H_2C-H_2C-OOC-C_6H_4-$ | 51 | $(sec)H_{17}C_8-OOC-C_6H_4-$ |
| 36 | $H_3C-C(OCH_3)-H_2C-H_2C-OOC-C_6H_4-$ | 52 | $(iso)H_{17}C_8-OOC-C_6H_4-$ |
| 37 | $H_3C-HC=HC-H_2C-OOC-C_6H_4-$ | 53 | $(iso)H_{19}C_9-OOC-C_6H_4-$ |
| 38 | cyclohexyl-OOC-C_6H_4- | 54 | $(n)H_{21}C_{10}-OOC-C_6H_4-$ |
| 39 | $C_6H_5-H_2C-OOC-C_6H_4-$ | 55 | $(n)H_{25}C_{12}-OOC-C_6H_4-$ |
| 40 | $C_6H_5-H_2C-H_2C-OOC-C_6H_4-$ | 56 | $Cl-H_2C-H_2C-OOC-C_6H_4-$ |
| 41 | $(n)H_7C_3-OOC-C_6H_4-$ | 57 | $HO-H_2C-H_2C-OOC-C_6H_4-$ |
| 42 | $(iso)H_7C_3-OOC-C_6H_4-$ | 58 | $H_3CO-H_2C-H_2C-OOC-C_6H_4-$ |
| 43 | $(n)H_9C_4-OOC-C_6H_4-$ | 59 | $H_5C_2O-H_2C-H_2C-OOC-C_6H_4-$ |
| 44 | $(iso)H_9C_4-OOC-C_6H_4-$ | 60 | $(n)H_9C_4O-H_2C-H_2C-OOC-C_6H_4-$ |
| 45 | $(sec)H_9C_4-OOC-C_6H_4-$ | 61 | $H_3C-OC-O-H_2C-H_2C-OOC-C_6H_4-$ |
| 46 | $(tert)H_9C_4-OOC-C_6H_4-$ | 62 | $C_6H_5-O-H_2C-H_2C-OOC-C_6H_4-$ |
| 47 | $(iso)H_{11}C_5-OOC-C_6H_4-$ | 63 | $H(-O-H_2C-H_2C-)_2-OOC-C_6H_4-$ |
| 48 | $(n)H_{13}C_6-OOC-C_6H_4-$ | 64 | $H_3C(-O-H_2C-H_2C-)_2-OOC-C_6H_4-$ |

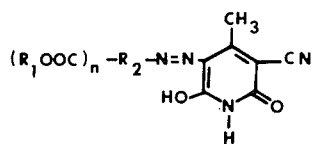

11

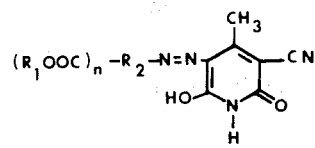

12

| No | $(R_1OOC)_n-R_2-$ |
|---|---|
| 65 | $H_5C_2(-O-H_2C-H_2C)_2-OOC-C_6H_4-$ |
| 66 | $(n)H_9C_4(-O-H_2C-H_2C)_2-OOC-C_6H_4-$ |
| 67 | $H(-O-H_2C-H_2C)_3-OOC-C_6H_4-$ |
| 68 | $H_3C(-O-H_2C-H_2C)_3-OOC-C_6H_4-$ |
| 69 | $H_5C_2(-O-H_2C-H_2C)_3-OOC-C_6H_4-$ |
| 70 | $(n)H_9C_4(-O-H_2C-H_2C)_3-OOC-C_6H_4-$ |
| 71 | $\begin{array}{l}H_3C\\H_3C-HC\\\phantom{H_3C-}OH\end{array}\!\!\!\!\!>\!\!C-OOC-C_6H_4-$ |
| 72 | $H_5C_2-HC(C_2H_5)-(H_2C)_2-OOC-C_6H_4-$ |
| 73 | $HO-H_2C-(H_2C)_5-OOC-C_6H_4-$ |
| 74 | $H_3CO-H_2C-(H_2C)_5-OOC-C_6H_4-$ |
| 75 | cyclohexyl-OOC-C_6H_4- |
| 76 | $H_3C$-cyclohexyl-OOC-C_6H_4- |
| 77 | $C_6H_5-H_2C-OOC-C_6H_4-$ |
| 78 | $Cl-C_6H_4-H_2C-OOC-C_6H_4-$ |
| 79 | $C_6H_5-H_2C-H_2C-OOC-C_6H_4-$ |

| No. | $(R_1OOC)_n-R_2-$ |
|---|---|
| 80 | $H_3C-C_6H_4-H_2C-H_2C-OOC-C_6H_4-$ |
| 81 | $(n)H_7C_3-OOC-C_6H_4-$ |
| 82 | $(iso)H_7C_3-OOC-C_6H_4-$ |
| 83 | $(n)H_9C_4-OOC-C_6H_4-$ |
| 84 | $(iso)H_9C_4-OOC-C_6H_4-$ |
| 85 | $(sec)H_9C_4-OOC-C_6H_4-$ |
| 86 | $(tert)H_9C_4-OOC-C_6H_4-$ |
| 87 | $(iso)H_{11}C_5-OOC-C_6H_4-$ |
| 88 | $(n)H_{13}C_6-OOC-C_6H_4-$ |
| 89 | $(n)H_{15}C_7-OOC-C_6H_4-$ |
| 90 | $(iso)H_{15}C_7-OOC-C_6H_4-$ |
| 91 | $(sec)H_{17}C_8-OOC-C_6H_4-$ |
| 92 | $(iso)H_{17}C_8-OOC-C_6H_4-$ |
| 93 | $(iso)H_{19}C_9-OOC-C_6H_4-$ |
| 94 | $(n)H_{25}C_{12}-OOC-C_6H_4-$ |
| 95 | $OC-O-H_2C-H_2C-OOC-C_6H_4-$ <br> $\phantom{OC-O-H_2}|$ <br> $\phantom{OC-O-H_2}CH_2-Cl$ |
| 96 | $Cl-H_2C-H_2C-OOC-C_6H_4-$ |

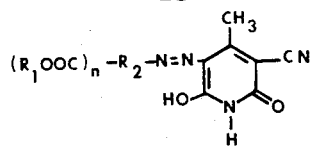
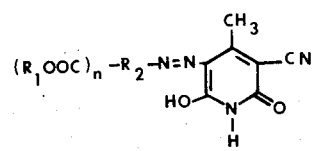

| No. | $(R_1OOC)_n-R_2-$ |
|---|---|
| 97 | $Br-H_2C-H_2C-OOC-C_6H_4-$ |
| 98 | $NC-H_2C-H_2C-OOC-C_6H_4-$ |
| 99 | $HO-H_2C-H_2C-OOC-C_6H_4-$ |
| 100 | $H_3CO-H_2C-H_2C-OOC-C_6H_4-$ |
| 101 | $H_5C_2-O-H_2C-H_2C-OOC-C_6H_4-$ |
| 102 | $(n)H_9C_4-O-H_2C-H_2C-OOC-C_6H_4-$ |
| 103 | $\overset{O-H_2C-H_2C-OOC-C_6H_4-}{\underset{OC-C_6H_5}{\mid}}$ |
| 104 | $H(-O-H_2C-H_2C)_2-OOC-C_6H_4-$ |
| 105 | $H_3C(-O-H_2C-H_2C)_2-OOC-C_6H_4-$ |
| 106 | $H_5C_2(-O-H_2C-H_2C)_2-OOC-C_6H_4-$ |
| 107 | $(n)H_9C_4(-O-H_2C-H_2C)_2-OOC-C_6H_4-$ |
| 108 | $H(-O-H_2C-H_2C)_3-OOC-C_6H_4-$ |
| 109 | $H_3C(-O-H_2C-H_2C)_3-OOC-C_6H_4-$ |
| 110 | $H_5C_2(-O-H_2C-H_2C)_3-OOC-C_6H_4-$ |
| 111 | $(n)H_9C_4(-O-H_2C-H_2C)_3-OOC-C_6H_4-$ |
| 112 | $HO-H_2C-H_2C-H_2C-H_2C-OOC-C_6H_4-$ |
| 113 | $\overset{Cl-H_2C}{\underset{Cl-H_2C}{>}}HC-OOC-C_6H_4-$ |
| 114 | $Cl-HC-H_2C-H_2C-OOC-C_6H_4-$ with $OH$ |
| 115 | $H_5C_2O-H_2C-H_2C-H_2C-H_2C-OOC-C_6H_4-$ |

| No. | $(R_1OOC)_n-R_2-$ |
|---|---|
| 116 | $HO-(H_2C)_{6(n)}-OOC-C_6H_4-$ |
| 117 | $H_2C=HC-H_2C-OOC-C_6H_4-$ |
| 118 | $H_2C=\underset{CH_3}{C}-H_2C-OOC-C_6H_4-$ |
| 119 | $H_3C-HC=HC-H_2C-OOC-C_6H_4-$ |
| 120 | $C_6H_{11}-OOC-C_6H_4-$ |
| 121 | $H_3CO-C_6H_{10}-OOC-C_6H_4-$ |
| 122 | $C_6H_5-H_2C-OOC-C_6H_4-$ |
| 123 | $H_3CO-C_6H_4-H_2C-OOC-C_6H_4-$ |
| 124 | $C_6H_5-H_2C-H_2C-OOC-C_6H_4-$ |
| 125 | $Cl-C_6H_4-H_2C-H_2C-OOC-C_6H_4-$ |
| 126 | $HO-H_2C-H_2C-H_2C-OOC-C_6H_4-$ |
| 127 | $H_3C-O-H_2C-H_2C-H_2C-OOC-C_6H_4-$ |
| 128 | $H_5C_2O-H_2C-H_2C-H_2C-OOC-C_6H_4-$ |
| 129 | $(n)H_9C_4O-H_2C-H_2C-H_2C-OOC-C_6H_4-$ |
| 130 | $H_3C-\underset{OH}{HC}-H_2C-OOC-C_6H_4-$ |
| 131 | $(n)H_9C_4-OOC-$ / $H_3CO-C_6H_3-$ |
| 132 | $(iso)H_7C_3-OOC-$ / $Cl-C_6H_3-$ |
| 133 | $H_5C_2(-O-H_2C-H_2C)_2-OOC-$ / $H_3CO-,Cl-C_6H_2-$ |

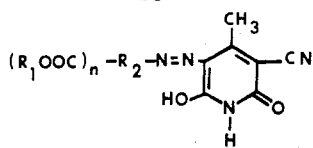
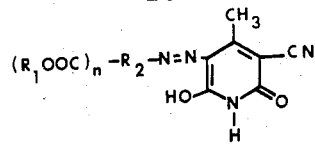
| No. | $(R_1OOC)_n$-$R_2$- |
|---|---|
| 134 | 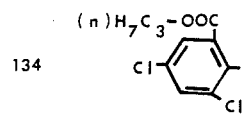 |
| 135 | 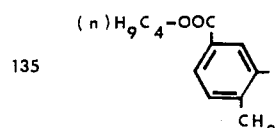 |
| 136 | 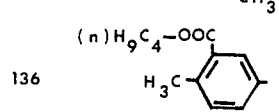 |
| 137 | 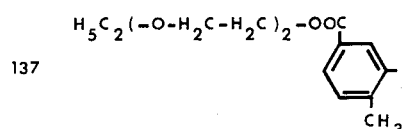 |
| 138 | 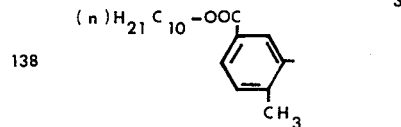 |
| 139 | 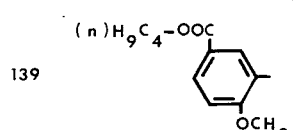 |
| 140 | 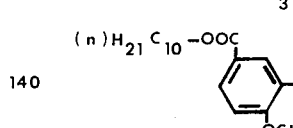 |
| 141 | 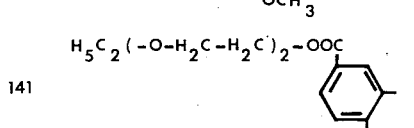 |
| 142 | 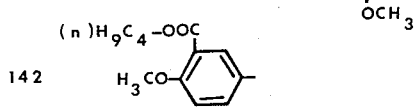 |
| 143 | 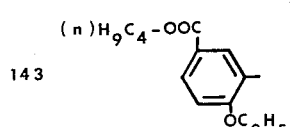 |
| 144 | 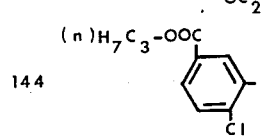 |
| 145 | 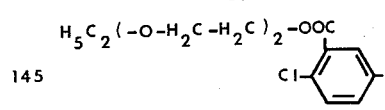 |
| No | $(R_1OOC)_n$-$R_2$- |
|---|---|
| 146 | 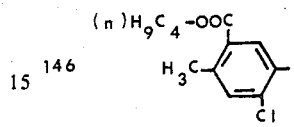 |
| 147 | 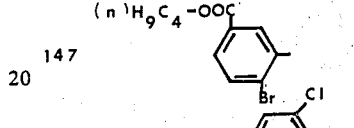 |
| 148 | 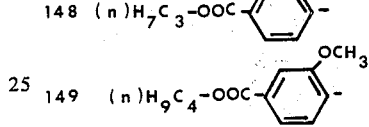 |
| 149 | 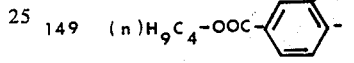 |
| 150 | 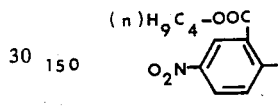 |
| 151 | 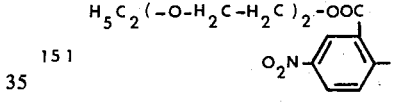 |
| 152 | 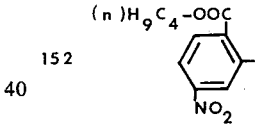 |
| 153 | 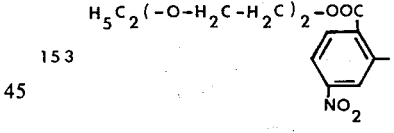 |
| 154 | 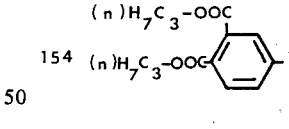 |
| 155 | 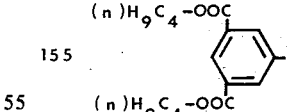 |
| 156 | 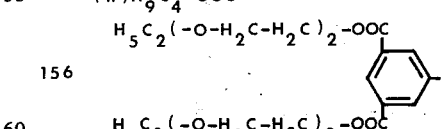 |
| 157 | 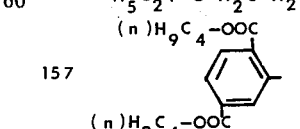 |
| 158 | 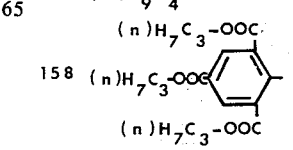 |

We claim:
1. In the process of dyeing and printing synthetic materials selected from the class consisting of polyolefins, polyvinyl compounds, polyacrylonitrile, cellulose-2 ½ acetate, cellulose triacetate and polyester materials wherein an aqueous dyestuff suspension is applied to the synthetic material and the synthetic material is steamed in the presence of a carrier between 80° to 110°C. or in the absence of a carrier between 110° to 140°C. or according to the thermofixing process at 180° to 230°C., the improvement wherein a monoazo dyestuff of the formula

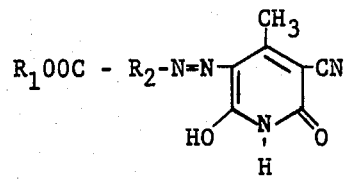

wherein $R_1$ is n-decyl or n-dodecyl and $R_2$ is phenylene is employed.

2. The process of claim 1 wherein $R_1$ is n-decyl and $R_2$ is p-phenylene.